United States Patent
Call

(10) Patent No.: US 8,240,432 B2
(45) Date of Patent: Aug. 14, 2012

(54) TREE STAND

(76) Inventor: Jimmie D Call, Hutchinson, KS (US)

( * ) Notice: Subject to any disclaimer, the term of this patent is extended or adjusted under 35 U.S.C. 154(b) by 358 days.

(21) Appl. No.: 12/497,284

(22) Filed: Jul. 2, 2009

(65) Prior Publication Data

US 2011/0000743 A1  Jan. 6, 2011

(51) Int. Cl.
 *E04G 5/06*   (2006.01)
(52) U.S. Cl. ......... 182/136; 182/133; 182/134; 182/135
(58) Field of Classification Search ................... 182/115, 182/116, 125, 133, 134, 135, 136
See application file for complete search history.

(56) References Cited

U.S. PATENT DOCUMENTS

| | | | | |
|---|---|---|---|---|
| 3,336,999 A | * | 8/1967 | McSwain | 182/20 |
| 4,022,292 A | | 5/1977 | Van Gompel | |
| 4,230,296 A | | 10/1980 | Staley | |
| 4,236,602 A | | 12/1980 | Leggett | |
| 4,417,645 A | | 11/1983 | Untz | |
| 4,493,395 A | | 1/1985 | Rittenhouse | |
| 4,549,635 A | * | 10/1985 | Early | 182/187 |
| 4,708,221 A | | 11/1987 | Kubiak | |
| 4,720,919 A | | 1/1988 | Saunders | |
| 4,726,447 A | * | 2/1988 | Gibson et al. | 182/135 |
| 4,730,699 A | | 3/1988 | Threlkeld | |
| 4,730,700 A | * | 3/1988 | Miller et al. | 182/187 |
| 4,742,888 A | * | 5/1988 | Amacker | 182/116 |
| 4,819,763 A | * | 4/1989 | Grote | 182/187 |
| 5,186,276 A | | 2/1993 | Craig | |
| 5,234,077 A | * | 8/1993 | Sheriff | 182/187 |
| 5,305,530 A | | 4/1994 | Robertson | |
| 5,347,722 A | | 9/1994 | Sefsick | |
| 5,363,941 A | * | 11/1994 | Richard | 182/187 |
| 5,437,377 A | | 8/1995 | Riemenschneider | |
| 5,465,933 A | | 11/1995 | Todd | |
| 5,482,241 A | | 1/1996 | Oglesby | |
| 5,595,333 A | | 1/1997 | Boston | |
| 5,723,808 A | | 3/1998 | Devall | |
| 5,738,080 A | | 4/1998 | Brocco | |
| 5,752,580 A | * | 5/1998 | Jenkins, Jr. | 182/100 |
| 5,791,436 A | * | 8/1998 | Talley, Sr. | 182/116 |
| 5,921,348 A | | 7/1999 | Louk | |
| 5,941,484 A | | 8/1999 | Stepney | |
| 6,012,439 A | | 1/2000 | Woodruff | |
| 6,021,768 A | | 2/2000 | Pomaville | |

(Continued)

OTHER PUBLICATIONS

Cabela'S World'S Foremost Outfitter, Treestands, Jun. 15, 2010, http://www.cabelas.com/cabelas/en/common/search/search-results; Cabela's Inc., One Cabela Drive, Sidney, NE 69160.

(Continued)

*Primary Examiner* — Katherine W Mitchell
*Assistant Examiner* — Colleen M Chavchavadze
(74) *Attorney, Agent, or Firm* — Spencer Fane Britt & Browne LLP

(57) ABSTRACT

A tree stand is provided, the tree stand including a platform support, first and second clamps rotatably attached to the platform support, and a platform attached to an upper portion of the platform support. Also provided is a climbing portion adapted to allow a user to enter and leave the tree stand. In some aspects of the invention, the various components of the tree stand can be easily assembled and disassembled for transporting and setting up the tree stand. The first and second clamps include openings for fasteners, which are used to secure the clamps to a tree.

14 Claims, 6 Drawing Sheets

U.S. PATENT DOCUMENTS

| | | | |
|---|---|---|---|
| 6,053,278 A * | 4/2000 | Myers | 182/20 |
| 6,308,800 B1 | 10/2001 | Graham | |
| 6,308,801 B1 * | 10/2001 | Futch | 182/136 |
| 6,419,097 B1 | 7/2002 | Anderson | |
| 6,523,183 B1 | 2/2003 | Wright | |
| 6,561,477 B1 | 5/2003 | Prive | |
| 6,571,916 B1 | 6/2003 | Swanson | |
| 6,663,059 B1 | 12/2003 | Warren | |
| 6,672,299 B2 | 1/2004 | Proctor | |
| 6,726,162 B1 | 4/2004 | Winter | |
| 6,811,180 B1 * | 11/2004 | Molliere | 280/652 |
| 6,988,755 B2 | 1/2006 | Lukas | |
| 7,021,423 B1 * | 4/2006 | Pestrue et al. | 182/116 |
| 7,165,750 B2 | 1/2007 | McCuskey et al. | |
| 7,306,074 B2 | 12/2007 | Voorhies | |
| 2006/0207833 A1 | 9/2006 | Kessinger | |
| 2007/0235255 A1 | 10/2007 | Wallace | |

OTHER PUBLICATIONS

Basspro Shops Archery 2010 Catalog; Treestands, Jun. 15, 2010; http://www.basspro,com/webapp/wcs/stores/servlet . . . BassPro Shops National Headquarters, 2500 E. Kearney, Springfield, MO 65898.

* cited by examiner

TREE STAND

CROSS-REFERENCE TO RELATED APPLICATIONS

Not applicable.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

FIELD

The present invention relates generally to the field of hunting, and more specifically to tree stands used in hunting.

INTRODUCTION

Tree stands are well-known and are commonly used by hunters—particularly bow hunters. Such stands have met with considerable commercial success. Tree stands allow a hunter to more easily survey an area and also keep the hunter at a height such that it is harder for an animal to catch the hunter's scent.

Existing tree stands typically include a chain or strap to secure the device to a tree. The chain or strap extends around the perimeter of the tree trunk, the ends being securely fastened to the tree stand. Once the chain or strap has been placed around the tree trunk it can be pulled tight, thereby securing the tree stand to tree trunks of varying thickness. Tree stands are typically positioned eight to sixteen feet above the ground, with factors such as cover provided by trees in the area and habits of the game animal being hunted, among other factors, determining the precise height at which a hunter will place a stand.

SUMMARY

The present teachings provide a tree stand, the tree stand including a platform support, first and second clamps rotatably attached to the platform support, and a platform attached to an upper portion of the platform support. Also provided is a climbing portion adapted to allow a user to enter and leave the tree stand. In some aspects of the invention, the various components of the tree stand can be easily assembled and disassembled for transporting and setting up the tree stand.

The first and second clamps include openings for fasteners, which are used to secure the clamps to a tree.

In accordance with another aspect of the invention, a climbing portion is provided, the climbing portion removably attached to the platform.

In yet another aspect of the invention, the climbing portion is a ladder.

In still another aspect of the invention, the climbing portion is a ladder that can be disassembled into a top portion, at least one middle portion, and a bottom portion.

These and other features, aspects and advantages of the present teachings will become better understood with reference to the following description, examples and appended claims.

DRAWINGS

Those of skill in the art will understand that the drawings, described below, are for illustrative purposes only. The drawings are not intended to limit the scope of the present teachings in any way.

FIG. 1a is a top schematic view of a platform support and clamps of a tree stand constructed in accordance with the teachings of the present invention; FIG. 1b is a side schematic view of a platform support and clamps of a tree stand constructed in accordance with the teachings of the present invention; FIG. 1c is a top schematic view of a platform support and clamps of a tree stand constructed in accordance with the teachings of the present invention wherein the tree has a perimeter smaller than that of the tree in FIG. 1a.

DETAILED DESCRIPTION

Figure 1A:
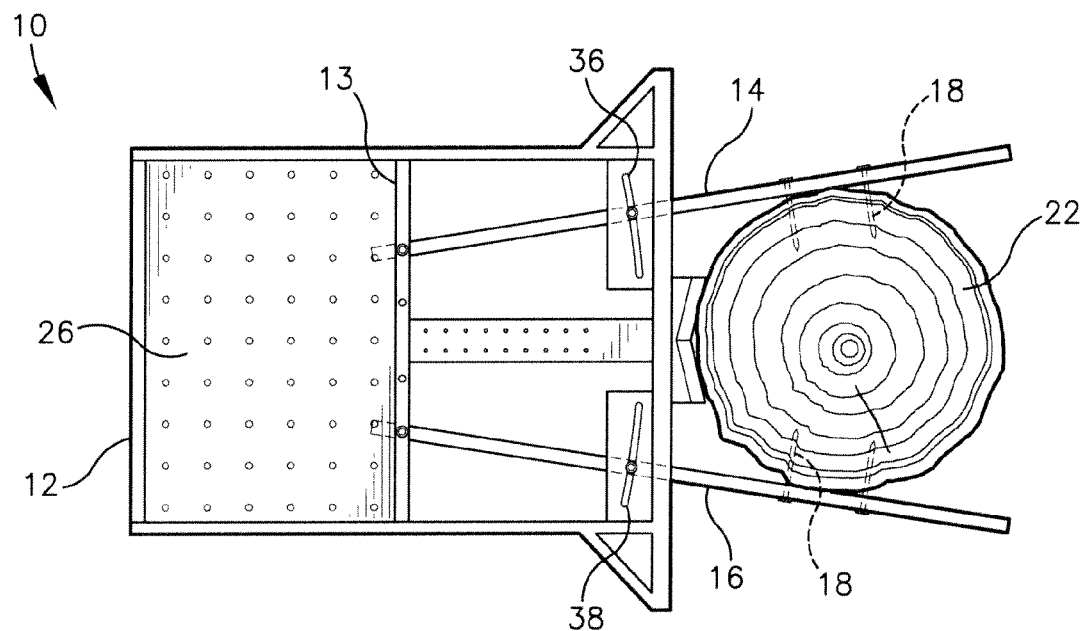

The present invention provides a novel tree stand designed primarily for use in hunting. According to one aspect of the present invention, the tree stand 10 includes a platform support 12, a first clamp 14, and a second clamp 16. Also included are a climbing portion 24 and a platform 26.

Platform support 12 functions as a frame for supporting platform 26, described below, and clamps 14 and 16. As shown in FIG. 1, platform support 12 is a generally rectangular frame structure with a crossbar 13 for strength and for providing a surface having slots 36 and 38 therein for slidable engagement of clamps 14 and 16. It is contemplated, however, that any suitable shape or design may be used for platform support 12, so long as platform support 12 is able to provide the necessary support for platform 26.

Figure 1B:
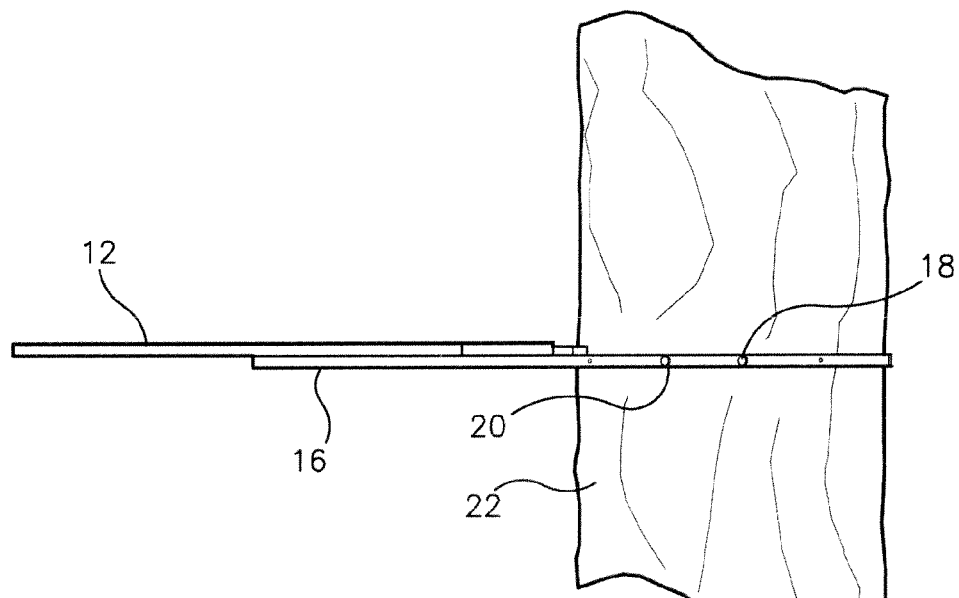
Figure 1C:
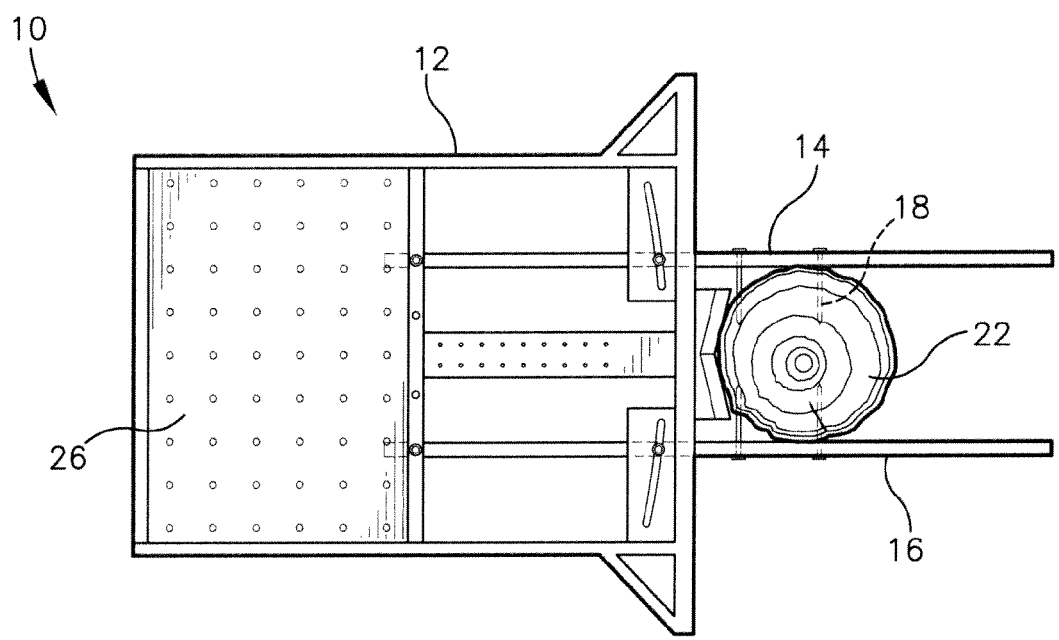

First clamp 14 is slidably engaged with to platform support 12 and extends away therefrom as shown in FIGS. 1a and 1c. As shown in the figures, first clamp 14 is generally rectangular or bar-like in shape and dimension, although it is contemplated that first clamp 14 may be cylindrical or may assume any other suitable shape. First clamp 14 includes a slide pin (not shown) attached thereto, the pin being received in slot 36 and allowing side-to-side movement of first clamp 14 attached to a crossbar 13.

First clamp 14 should have a length sufficient to extend from the location of its attachment to platform support 12 to at least partially along a perimeter of a tree 22 on which tree stand 10 is to be mounted. At least one opening is provided along the length of first clamp 14, and extending through a width thereof, for insertion of a fastener and securing of first clamp 14 to a tree. As shown in FIG. 1, a plurality of such openings are provided, and two are used in securing first clamp 14 to tree 22. The plurality of openings 20 is provided so that a suitable number of openings (generally at least two, though in some instances one may suffice) will align with the perimeter of a tree for mounting the tree stand to that tree. The precise number and spacing of openings 20 may be varied according to need and suitability for mounting to any particular tree or multiple trees or types of trees.

Second clamp 16 is substantially similar to first clamp 14 in that it is also rotatably attached to platform support 12 and extends at least partially along a perimeter of a tree 22 on which tree stand 10 is to be mounted. Second clamp 16 may, as with first clamp 14, be of any suitable shape or length, and it is not necessary that second clamp 16 be substantially similar to first clamp 14 with respect to shape and dimensions. Second clamp 16 includes a plurality of openings 20, as well as a pin, as described with respect to first clamp 14, above.

Fasteners 18 are used to secure tree stand 10 to a tree or other suitable or desired structure. Openings 20 in first and second clamps 14 and 16 are each adapted to receive a fastener 18. Fasteners 18 may be screws, bolts, nails, rods, or any other suitable fastener for securing tree stand 10 to a tree or other structure. The length, width, and other dimensions of fasteners 18 may vary, and may even vary among individual fasteners in a single implementation of the present invention. It is contemplated that one of skill in the art will be able, upon reading this disclosure, to readily determine suitable types of fasteners 18, and their dimensions, with respect to securing tree stand 10 to any given tree or structure.

Figure 2:
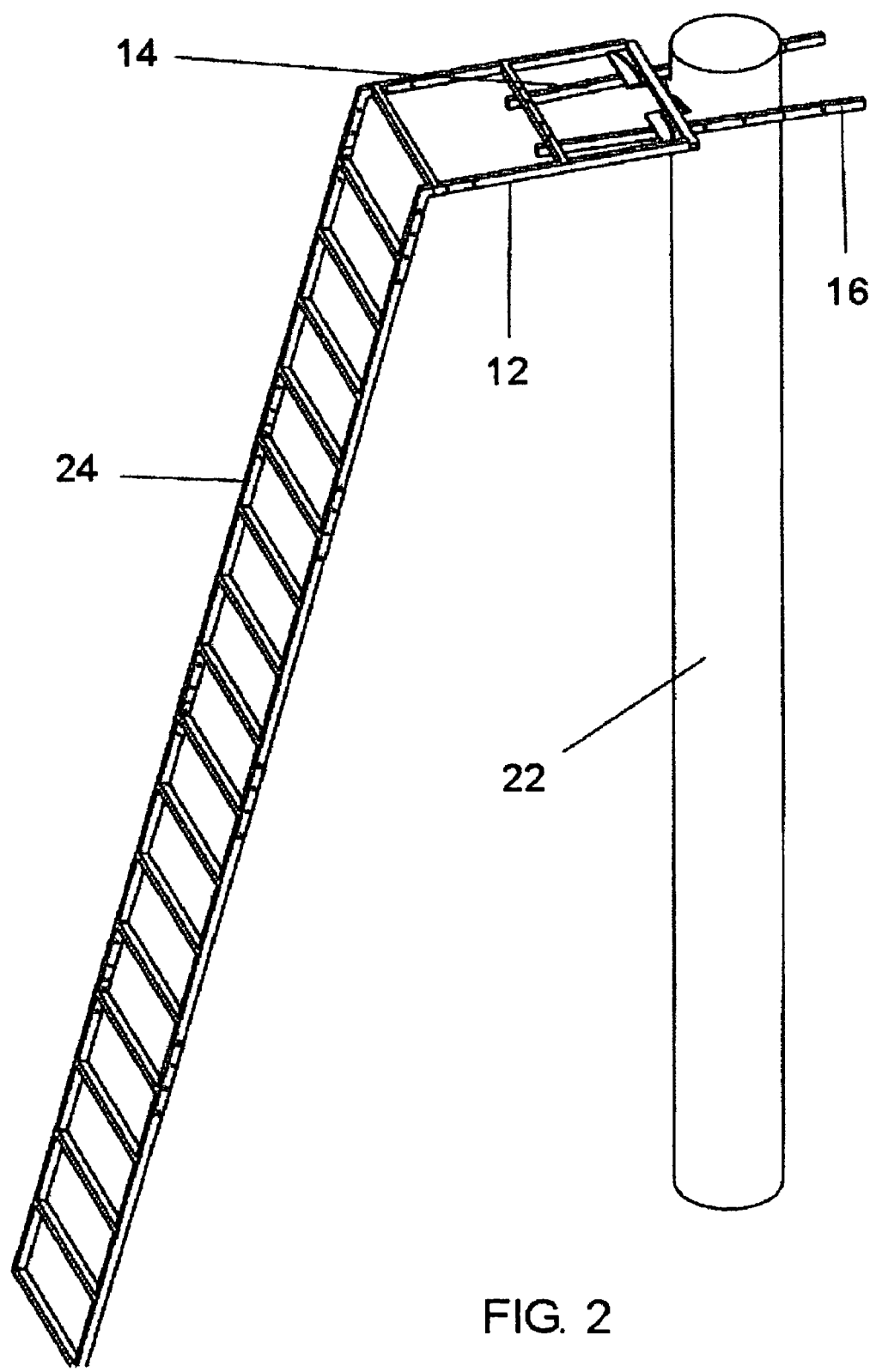
FIG. 2 is a side elevational view of a tree stand according to the present invention, excluding a platform.
Figure 3:
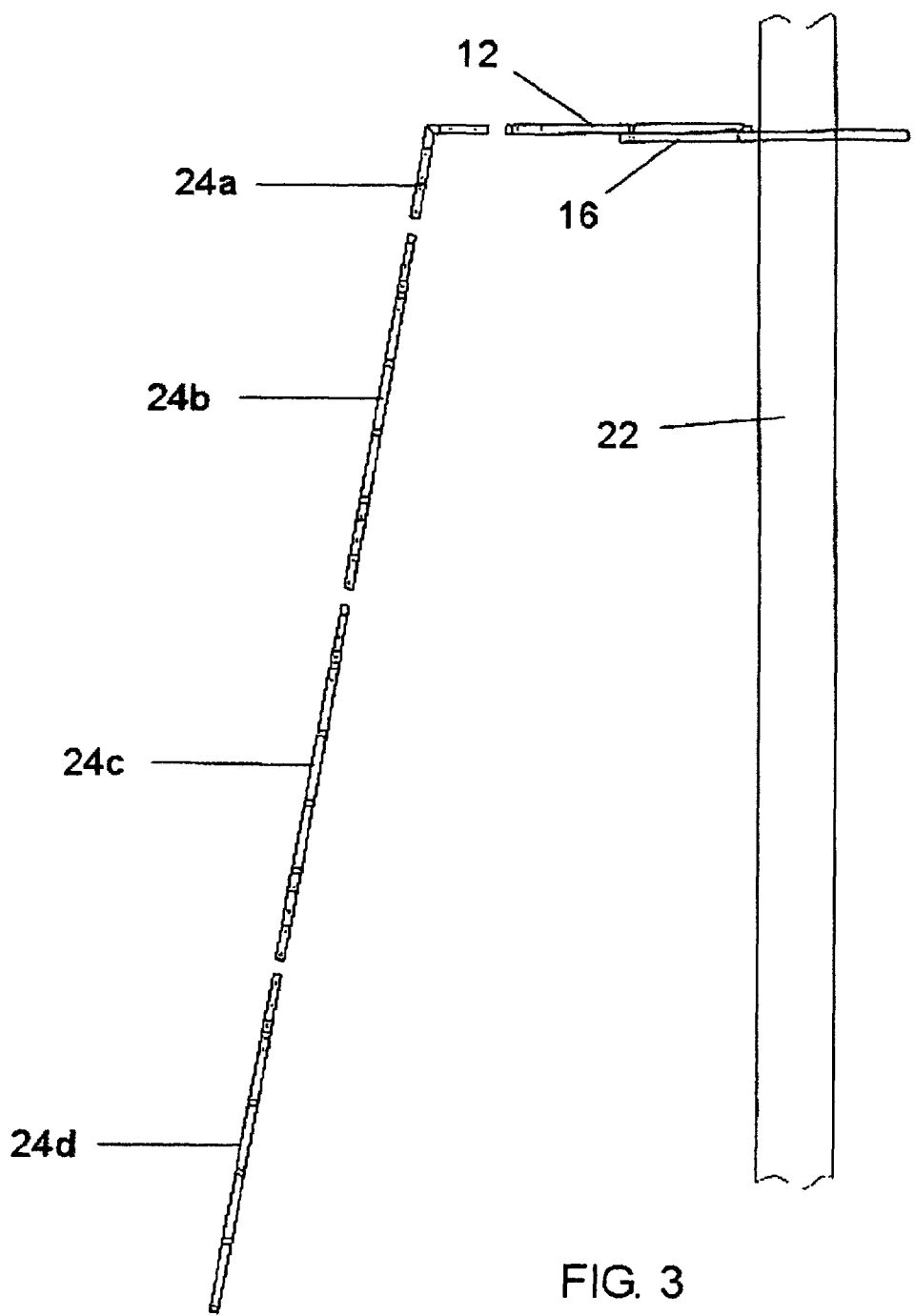
FIG. 3 is a side schematic view of a tree stand according to the present invention, excluding a platform, wherein the climbing portion is shown in various disassembled portions.

As shown in FIGS. 2 and 3, the present tree stand further includes a climbing portion 24 for a user thereof to ascend in order to use the stand. Climbing portion 24 may, for example, be a ladder, such as shown in FIG. 2. For ease of portability and assembly at the location in which tree stand 10 is to be used, climbing portion 24 may be separable into multiple component parts, which can then be readily reassembled when necessary or desirable. As shown in FIG. 3, for example, climbing portion 24 is a ladder capable of disassembly and includes an upper portion 24a, a first middle portion 24b, a second middle portion 24c, and a lower portion 24d. It is contemplated that climbing portion 24 may be disassembled into 2, 3, 4, or more component parts.

Although climbing portion 24 is shown in the figures as being a ladder, it is contemplated that any suitable climbing portion may be used. This includes rope structures, chain-link structures, or any other suitable structure that allows a user of tree stand 10 to climb up and onto the platform associated therewith. In some uses, however, tree stand 10 may require climbing portion 24 for additional support.

As shown in FIG. 1a, a platform 26 may also be included with the present invention (see below for description of the present tree stand without a separate platform and platform support), the platform being attached to an upper surface of platform support 12. The platform may be constructed from any suitable material, including various metals, woods, or synthetic materials, and may be attached to platform support 12 by the use of any suitable fasteners, including screws, bolts, and the like. It is further contemplated that platform 26 and platform support 12 may be provided as a unitary, single construction, with first and second clamps 14 and 16 rotatably attached thereto.

Platform 26 may be provided as a substantially flat structure upon which a user, such as a hunter, may sit or stand. Platform 26 may also be provided with any suitable rail structure or other safety feature, to prevent accidental falling from tree stand 10. Various safety features known in the art can be incorporated into the present invention, and such features and their method of incorporation will be readily apparent to those of skill in the art upon reading this disclosure.

Figure 4:
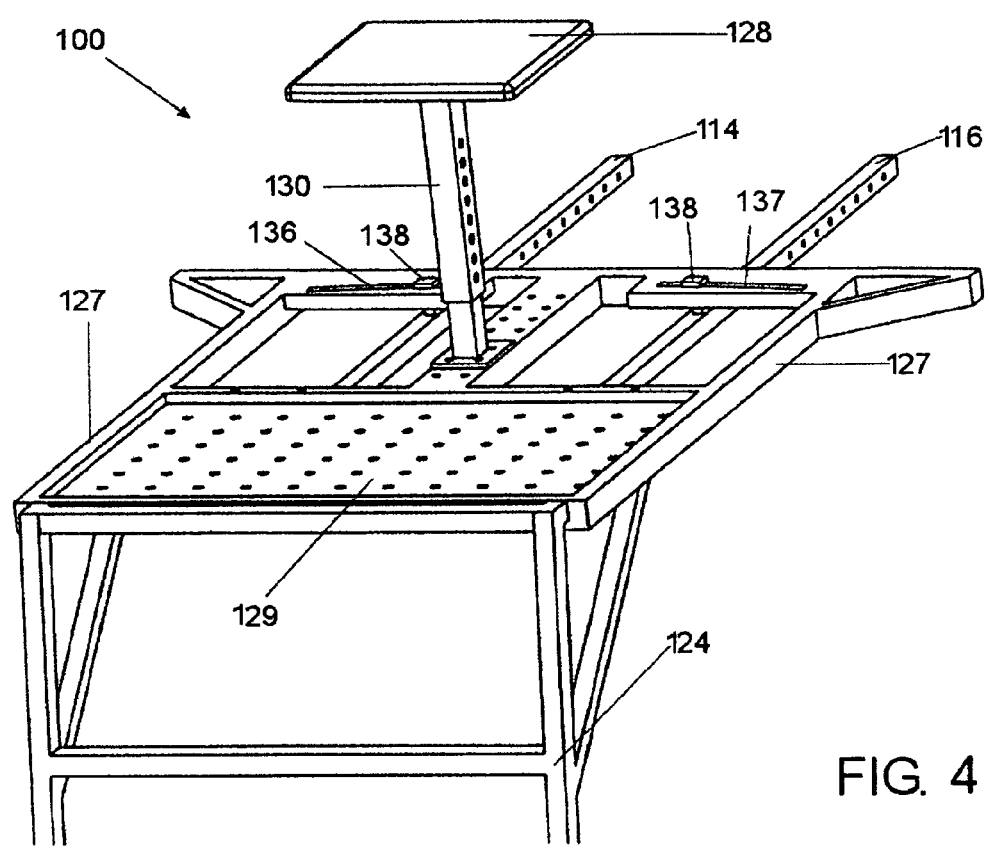
FIG. 4 is an elevational view of a tree stand according to the present invention, the tree stand including a seat thereon.

FIG. 4 provides an illustration of a tree stand constructed in accordance with the teachings of the present invention, the tree stand having first and second clamps 114 and 116 slidably engaged directly with a platform 127, and also including a seat associated therewith. As shown in FIG. 4, tree stand 100 includes a first clamp 114 and a second clamp 116 that function in substantially the same manner as first and second clamps 14 and 16, described above. Each of clamps 114 and 116 includes a slide pin 138 attached thereto, each pin 138 being slidingly engaged with slots 136 and 137, respectively, to allow adjustment of first and second clamps 114 and 116 so that they are able to engage trees of varying thickness. The clamp slots are substantially rectangular and include a slight arc to accommodate the pivoting of the clamps 114,116 while the pin 138 slides therein, and the pin width is approximately equal to the clamp slot width, which is substantially constant. The pin width is slightly smaller than the clamp slot width, so that the pin 137 slides within the slot 137.

As shown in FIG. 4, platform 127 of tree stand 100 is a single, unitary component of the tree stand 100. Platform 127 includes a depression 129 having a plurality of openings therethrough. These openings allow draining of water when, for example, the tree stand 100 is used during rainy conditions. It is contemplated that the size and shape of the plurality of openings may vary, or that the openings in depression 129 may be eliminated altogether. A seat 128 is also provided with tree stand 100, the seat having a sleeve 130 that includes a plurality of openings for receiving a pin therethrough for adjusting the height of the seats. Such adjustable seats are well-known in the art and will not be described in detail here. It is contemplated that any suitable seat may be used in conjunction with any of the tree stands described herein.

Tree stand 100, as shown in FIG. 4, is also provided with a climbing portion 124 that functions substantially as described with respect to climbing portion 24, above.

Figure 5:
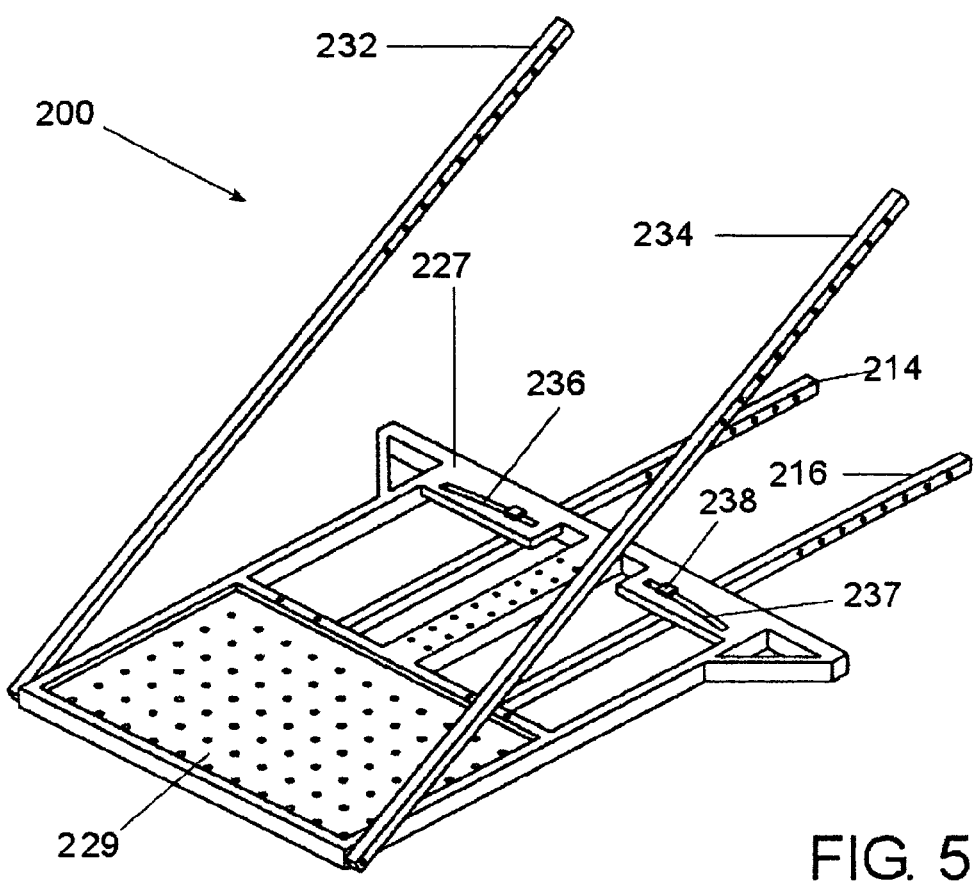
FIG. 5 is an elevational view of a tree stand according to the present invention, the tree stand lacking a climbing portion and including four clamps.

FIG. 5 provides a tree stand 200 having first and second clamps 214 and 216, each including slide pins 238 thereon, a platform 227 including slots 236 and 237 therein, and third and fourth clamps 232 and 234, respectively. Third and fourth clamps 232 and 234 are rotatably attached to platform 227 to allow them to move in an up and down direction (as opposed to a left and right direction, as is the case with first and second clamps 214 and 216). It is contemplated, however, that some degree of side to side movement is available for third and fourth clamps 232 and 234.

Third and fourth clamps 232 and 234 have a plurality of openings along lengths thereof and extending therethrough. These openings may be used to receive fasteners thereby attaching third and fourth clamps 232 and 234 to a surface of a tree. With third and fourth clamps 232 and 234 present and firmly attached to a surface of a tree, a climbing portion is not necessary to provide additional support to the tree stand. Lack of a climbing portion can prevent unauthorized access to the tree stand when it is not in use by an owner of the stand or by an individual authorized by the owner. A portable climbing portion may be brought to the location of the stand by an owner or authorized person in order that they may gain access to the tree stand. Further, when the stand is in use the portable climbing portion may be pulled up onto the stand itself, thereby rendering the tree stand less obvious at ground level.

The present invention may be constructed from a variety of suitable materials. Structure portions must have the requisite strength and other properties necessary for the tree stand to function as intended. Suitable materials include, but are not limited to, various woods and metals. It is contemplated that wood and metal components of the present invention, if any, may be treated to withstand the elements. Other components of the present invention, such as, for example, the platform, may be constructed from light-weight but strong synthetic materials, such as various plastics or carbon fiber. It is contemplated that any component of the present invention may be constructed of any material suitable to the task, and that the scope of the present invention is in no way limited by the materials chosen.

Other Embodiments

The detailed description set-forth above is provided to aid those skilled in the art in practicing the present invention. However, the invention described and claimed herein is not to be limited in scope by the specific embodiments herein disclosed because these embodiments are intended as illustration of several aspects of the invention. Any equivalent embodiments are intended to be within the scope of this invention. Indeed, various modifications of the invention in addition to those shown and described herein will become apparent to those skilled in the art from the foregoing description which do not depart from the spirit or scope of the present inventive discovery. Such modifications are also intended to fall within the scope of the appended claims.

What is claimed is:

1. A tree stand comprising:
   a platform support including a crossbar;
   a first clamp rotatably attached to said crossbar and extending away therefrom, the first clamp having a first slide pin with a first slide pin width, and at least one opening in the first clamp and extending through a width thereof adapted to receive a fastener;
   a substantially rectangular first clamp slot having a substantially constant first clamp slot width approximately equal to the first slide pin width, and the first clamp slot being located on said platform support wherein said first slide pin slidably engages in said first clamp slot allowing side-to-side movement of said first clamp;
   a second clamp rotatably attached to said crossbar and extending away therefrom, the second clamp having a second slide pin with a second pin width, and at least one opening in the second clamp and extending through a width thereof adapted to receive a fastener;
   a substantially rectangular second clamp slot having a substantially constant second clamp slot width approximately equal to the second slide pin width, and the second clamp slot being located on said platform support wherein said second slide pin slidably engages in said second clamp slot allowing side-to-side movement of said second clamp; and
   a platform fixedly attached to an upper surface of said platform support, wherein in use said first clamp extends along a first surface of a tree and said second clamp extends along a second surface of said tree, and further wherein said first and second clamps are secured to said tree by fasteners.

2. The tree stand according to claim 1 further comprising a climbing portion attached to said platform support and extending downward therefrom such that in use said climbing portion is adapted to allow a user of the tree stand to climb onto said platform.

3. The tree stand according to claim 2 wherein said climbing portion is a ladder.

4. The tree stand according to claim 2 wherein said climbing portion is removably attached to said platform.

5. The tree stand according to claim 4 wherein said ladder comprises a top portion that is removably attachable to said platform, at least one middle portion removably attachable to said top portion, and a lower portion removably attachable to said at least one middle portion.

6. The tree stand of claim 1 wherein said platform has a plurality of openings therethrough for drainage.

7. The tree stand of claim 1 further comprising: a third clamp rotatably attached to said platform support and extending away therefrom, the third clamp having at least one opening in a length thereof and extending through a width thereof adapted to receive a fastener; and a fourth clamp rotatably attached to said platform support and extending away therefrom, the fourth clamp having at least one opening in a length thereof and extending through a width thereof adapted to receive a fastener, wherein in use said third clamp extends along a third surface of said tree and said fourth clamp extends along a fourth surface of said tree, and further wherein said third and fourth clamps are secured to said tree by fasteners.

8. A tree stand comprising:
   a platform including a crossbar;
   a first clamp rotatably attached to said crossbar and extending away therefrom, the first clamp having a first slide pin with a first slide pin width, and at least one opening in the first clamp and extending through a width thereof adapted to receive a fastener;
   a substantially rectangular first clamp slot having a substantially constant first clamp slot width approximately equal to the first slide pin width, and the first clamp slot being located on said platform wherein said first slide pin slidably engages in said first clamp slot allowing side-to-side movement of said first clamp; and
   a second clamp rotatably attached to said crossbar and extending away therefrom, the second clamp having a second slide pin with a second pin width, and at least one opening in the second clamp and extending through a width thereof adapted to receive a fastener;
   a substantially rectangular second clamp slot having a substantially constant second clamp slot width approximately equal to the second slide pin width, and the second clamp slot being located on said platform wherein said second slide pin slidably engages in said second clamp slot allowing side-to-side movement of said second clamp; and
   wherein in use said first clamp extends along a first surface of a tree and said second clamp extends along a second surface of said tree, and further wherein said first and second clamps are secured to said tree by fasteners.

9. The tree stand according to claim 8 further comprising a climbing portion attached to said platform and extending downward therefrom such that in use said climbing portion is adapted to allow a user of said tree stand to cling onto said platform.

10. The tree stand according to claim 9 wherein said climbing portion is a ladder.

11. The tree stand according to claim 9 wherein said climbing portion is removably attached to said platform.

12. The tree stand according to claim 10 wherein said ladder comprises a top portion that is removably attachable to said platform, at least one middle portion removably attachable to said top portion, and a lower portion removably attachable to said at least one middle portion.

13. The tree stand of claim 8 wherein said platform has a plurality of openings.

14. The tree stand of claim 8 further comprising: a third clamp rotatably attached to said platform and extending away therefrom, the third clamp having at least one opening in a length thereof and extending through a width thereof adapted to receive a fastener; and a fourth clamp rotatably attached to said platform and extending away therefrom, the fourth clamp having at least one opening in a length thereof and extending through a width thereof adapted to receive a fastener, wherein in use said third clamp extends along a third surface of said tree and said fourth clamp extends along a fourth surface of said tree, and further wherein said third and fourth clamps are secured to said tree by fasteners.

* * * * *